United States Patent
Hansen et al.

(10) Patent No.: US 7,266,275 B2
(45) Date of Patent: Sep. 4, 2007

(54) NONLINEAR OPTICAL FIBRE METHOD OF ITS PRODUCTION AND USE THEREOF

(75) Inventors: Kim Per Hansen, Kgs. Lyngby (DK); Jacob Riis Folkenberg, Kokkedal (DK)

(73) Assignee: Crystal Fibre A/S, Birkerod (DK)

( * ) Notice: Subject to any disclaimer, the term of this patent is extended or adjusted under 35 U.S.C. 154(b) by 89 days.

(21) Appl. No.: 10/507,723

(22) PCT Filed: Mar. 14, 2003

(86) PCT No.: PCT/DK03/00178

§ 371 (c)(1),
(2), (4) Date: Jun. 6, 2005

(87) PCT Pub. No.: WO03/079074

PCT Pub. Date: Sep. 25, 2003

(65) Prior Publication Data

US 2005/0238307 A1 Oct. 27, 2005

(30) Foreign Application Priority Data

Sep. 24, 2002 (DK) ................................ 2002 01412

(51) Int. Cl.
*G02B 6/02* (2006.01)
*C03B 37/022* (2006.01)

(52) U.S. Cl. .................... 385/125; 385/123; 65/393; 65/409; 65/428; 65/439

(58) Field of Classification Search .............. 385/11, 385/123–128; 65/393, 409, 411, 428, 439
See application file for complete search history.

(56) References Cited

U.S. PATENT DOCUMENTS 5,802,236 A 9/1998 DiGiovanni et al.

(Continued)

FOREIGN PATENT DOCUMENTS

EP 1 172 339 1/2002

(Continued)

OTHER PUBLICATIONS

Takushima, et al., "Photonics Technology Letters," IEEE Photonic Technology Letters, vol. 11, No. 3, pp. 322-324, Mar. 1999.

(Continued)

*Primary Examiner*—Hemang Sanghavi
(74) *Attorney, Agent, or Firm*—Jacobson Holman PLLC

(57) ABSTRACT

An optical fiber having a longitudinal direction and a cross-section perpendicular thereto, said fiber in a cross-section comprising: (a) a core region (11) having a refractive index profile with a highest refractive index $n_c$, and (b) a cladding region comprising cladding features (10) having a center-to-center spacing, $\Lambda$, and a diameter, d, of around $0.4\Lambda$ or larger, wherein $n_c$, $\Lambda$ and d are adapted such that the fiber exhibits zero dispersion wavelength of a fundamental mode in the wavelength range from 1530 nm to 1640 nm; a method of producing such a fiber; and use of such an optical fiber in e.g. an optical communication system, in an optical fiber laser, in an optical fiber amplifier, in an optical fiber Raman amplifier, in a dispersion compensator, in a dispersion and/or dispersion slope compensator.

36 Claims, 16 Drawing Sheets

U.S. PATENT DOCUMENTS

| | | | |
|---|---|---|---|
| 6,097,870 A | 8/2000 | Ranka et al. | |
| 6,347,174 B1 | 2/2002 | Onishi et al. | |
| 6,636,677 B2 * | 10/2003 | Hasegawa et al. | 385/127 |
| 6,788,865 B2 * | 9/2004 | Kawanishi et al. | 385/125 |
| 6,845,204 B1 * | 1/2005 | Broeng et al. | 385/126 |

FOREIGN PATENT DOCUMENTS

| | | |
|---|---|---|
| WO | 00/06506 | 2/2000 |
| WO | 00/49436 | 8/2000 |
| WO | 01/31376 | 5/2001 |
| WO | 02/12931 | 2/2002 |
| WO | 02/14946 | 2/2002 |

OTHER PUBLICATIONS

Munro, et al., "Holey Optical Fibers: An Efficient Modal Model," Journal of Lightwave Technology, vol. 17, No. 6, pp. 1093-1102, Jun. 1999.

Ranka, et al., "Visible Continuum Generation in Air-Silica Microstructure Optical Fibers with Anomalous Dispersion at 800 nm" Optics Letters, vol. 25, No. 1, pp. 25-27, Jan. 2000.

Futami, et al., "All-Optical Data Addition to a Time Slot in 160-Gb/s OTDM Signal Using Supercontinuum in a Nonlinear Fiber," European Conference on Optical Communications, 2000.

Petropoulos, et al., "A Highly Nonlinear Holey Fiber and its Application in a Regenerative Optical Switch," Optical Fibre Communication Conference, pp. 1-3, 2000.

Hansryd, et al., "Broad-Band Continuous-Wave-Pumped Fiber Optical Parametric Amplifier with 49-dB Gain and Wavelength-Conversion Efficiency," IEEE Photonics Technology Letters, vol. 13, No. 3, pp. 194-196, Mar. 2001.

Ferrando, et al., "Designing the Properties of Dispersion-Flattened Photonic Crystal Fibers," Optics Express, vol. 9, No. 13, pp. 687-697, Nov. 2001.

Coen et al. "White-light Supercontinuum Generation with 60-ps Pump Pulses in a Photonic Crystal Fiber," Optics Letters, vol. 26, No. 17, pp. 1356-1358, Sep. 2001.

Hansen, et al., "Super Continuum Generation at 800 nm in Highly Nonlinear Photonic Crystal Fibers with Normal Dispersion," IEEE Photonics Technology Letters, LEOS Conference, 2001.

White, et al., "Confinement Losses in Microstructured Optical Fibers," Optics Letters, vol. 26, No. 21, pp. 1660-1662, Nov. 2001.

Sharping, et al., "All-Optical Switching Based on Cross-Phase Modulation in Microstructure Fiber," IEEE Photonics Technology Letters, vol. 14, No. 1, pp. 77-79, Jan. 2002.

Yusoff, et al. "Raman Effects in a Highly Nonlinear Holey Fiber: Amplification and Modulation," Optics Letters, vol. 27, No. 6, pp. 424-426, Mar. 2002.

Gnauck, et. al. "2.5 Tb/s (64×42.7 Gb/s) Transmission Over 40×100 km NZDSF Using RZ-DPSK Format and All-Raman-Amplified Spans," Optical Fiber Communication Conference, Postdeadline Papers, 2002.

* cited by examiner

NONLINEAR OPTICAL FIBRE METHOD OF ITS PRODUCTION AND USE THEREOF

This is a nationalization of PCT/DK03/00178 filed Mar. 14, 2003 and published in English.

1. BACKGROUND OF THE INVENTION

The present invention relates to a nonlinear optical fibre having a small core and special dispersion properties, a method of producing such a fibre, and use of such a fibre.

THE TECHNICAL FIELD

Nonlinear optical fibres with zero-dispersion wavelength (ZDW) around 1.5 µm are attractive for a range of telecom applications such as 2R regeneration, multiple clock recovery, optical parametric amplifiers (OPAs), pulse compression, soliton generation, wavelength conversion, alloptical switching and supercontinuum-based wavelength demultiplexed (WDM) telecom sources (see for example Petropoulos et al., *Optical Fiber Communication Conference*, 2001; Futami et al., *European Conference on Optical Communications*, 2000; Hansryd et al., *Photonics Technology Letters* 13(3), pp. 194-196, 2001; Sharping et al., IEEE Photonics Technology Letters, Vol. 14 Issue. 1, pp. 7-79, 2002; or Takushima et al., *Photonics Technology Letters* 11(3), pp. 322-324, 1999).

In the prior art, nonlinear optical fibres with ZDW around 1.5 µm have been based on standard optical fibre technology, where a solid high-index core is surrounded by a solid cladding having a lower refractive index than the core (see for example U.S. Pat. No. 6,347,174). Typically prior art nonlinear fibres with ZDW around 1.5 µm have a nonlinear coefficient of approximately 10 $(Wkm)^{-1}$. For applications such as e.g. OPAs, nonlinear coefficients of this order demands fibre lengths on the order of hundreds of meters.

Within the past five years, a new type of optical fibre has emerged. This type of fibre employs microstructured features running along the fibre axis, and is referred to by several names, e.g. microstructured fibres, photonic crystal fibres (PCF), holey fibres, or hole-assisted fibres.

Typically the microstructured features are voids (such as for example air holes) and the voids may provide this fibre type several advantages compared to standard technology nonlinear fibres. The high index difference between the silica core and air-filled microstructure features enables tight mode confinement to the fibre core—thereby resulting in a small effective area and consequently a high nonlinear coefficient. In addition, the ability of the cladding structure to be tailored enables high flexibility in the design of the dispersion profile (see for example Ferrando et al., *Optics Express* 9(13), pp. 687-697, 2001; Monro et al. *Journal of Lightwave Technology*, Vol. 17, No. 6, pp. 1093-1102, 1999; or WO 0212931). This flexibility facilitates generation of different nonlinear effects, especially by the choice of zero-dispersion wavelength (ZDW).

In particular, microstructured fibres may be realized with very small cores (smaller than 3 µm in diameter) and ZDW at relatively short wavelengths (shorter than 1.3 µm). Such nonlinear microstructured fibres have received a significant interest (see for example U.S. Pat. No. 6,097,870) and a much studied area of these fibres is super continuum generation with pumping wavelength around 600-800 nm (see for example Ranka et al., Optics Letters 25[1], pp. 25-27, 2000; Coen et al. *Optics Letters* 26(17), pp. 1356-1358, 2001., or Hansen et al., *LEOS Conference* 2001, 2001. A number of potential applications exist of super continual including optical coherence tomography, spectroscopy, and meteorology.

PRIOR ART DISCLOSURES

While nonlinear microstructured fibres with ZDW shorter than 1.3 µm have been extensively studied, prior art microstructured fibres with ZDW around 1.5 µm have only been addressed in theoretical works—see for example Ferrando et al., *Optics Express* 9(13), pp. 687-697, 2001; Monro et al. *Journal of Lightwave Technology*, Vol. 17, No. 6, pp. 1093-1102, 1999; or WO 02/12931. The fibres disclosed by Ferrando et al. and Monro et al. with ZDW around 1.5 µm have a microstructured cladding comprising close-packed air holes with a diameter, d, of around 0.3 times a centre-to-centre spacing, Λ. The fibres are further characterized by a solid, pure silica core with a diameter of around 3.9 µm or larger (the core diameter being approximately equal to 2Λ-d).

White et al. in *Optics Letters* 26(21), pp. 1660-1662, 2001 disclose a microstructured fibres with large air holes in order to reduce confinement losses. Nothing is indicated nor suggested about tailoring of dispersion properties, in particular to provide ZDW around 1.5 µm. Further nothing is disclosed about a flat dispersion slope.

Barkou et al., WO 02/12931, disclose a nonlinear microstructured optical fibre having an inner cladding and an outer cladding wherein the inner cladding holes are smaller than the outer cladding holes. Nothing is indicated nor suggested about providing an optical fibre with a non-partitioned cladding with substantially equal sized cladding features.

Generally, it is desired to provide ZDW or near-zero dispersion over an extended wavelength range. Hence, it is generally desired to be able to control not only the dispersion at a given wavelength, but also the dispersion slope of nonlinear optical fibre. The dispersion slope is the derivative of the dispersion with respect to wavelength and, thereby, control of the dispersion slope provides control of the dispersion over a broad wavelength range. This facilitates broadband applications, for example continuum generation over broad wavelength ranges and nonlinear processes, where a pump and signal light are broadly separated. Depending on the specific application, the broadness in terms of wavelength range may be a few nanometres or it may be several hundreds and even more than a thousand nanometres.

Another important area of applications of nonlinear optical fibres includes Raman amplification (see for example Agrawal, "Nonlinear fiber optics", Third Ed., Academic Press; Yusoff et al. Optics Letters, Vol. 27, No. 6, 2002). In optical communications, Raman fibre amplifiers are use for both discrete amplification and distributed amplification. In the former case the nonlinear fibre is inserted as an component at one or more discrete site of an optical communication link, whereas in the latter case the nonlinear fibre constitute a part of the transmission link in an optical communication system. Especially, for use of nonlinear optical fibre in optical communications, it is important to control the dispersion and often also the dispersion slope of the nonlinear optical fibre. Hence, in order to control for the development of nonlinear fibres for optical communication systems, there are three important parameters: the nonlinear coefficient, the dispersion, and the dispersion slope. An important use of nonlinear optical fibre in optical communication systems is as Raman amplifier that at the same time provides dispersion and/or dispersion slope compensation (see for example Gnauck et al. Optical Fiber Communication Conference, post deadline paper FC-2, 2002, where dispersion compensating modules are also used for Raman amplification). Hence, it is desired to provide nonlinear fibres with dispersion and/or dispersion slope compensating characteristics that at the same time has a high nonlinear coefficient in order to allow for Raman amplification.

2. DISCLOSURE OF THE INVENTION

Object of the Invention

It is an object of the present invention to provide new fibre designs of nonlinear fibres, where the nonlinear coefficient, the dispersion and the dispersion slope may be tailored more freely than for prior art nonlinear fibres.

It is a further object of the present invention to provide new designs of nonlinear optical fibres, where the dispersion and the dispersion slope may be tailored precisely, while a high nonlinear coefficient is simultaneously obtained.

It is, therefore, an object of the present invention to provide nonlinear microstructured optical fibres with ZDW around 1.5 µm for hole sizes larger than d/Λ=0.3.

Further objects appear from the description elsewhere.

Solution According to the Invention

In a first aspect, the present invention relates to an optical fibre having a longitudinal direction and a cross-section perpendicular thereto, said fibre in a cross-section comprising:
(a) a core region having a refractive index profile with a highest refractive index $n_c$, and
(b) a cladding region comprising cladding features having a centre-to-centre spacing, Λ, and a diameter, d, of around 0.4Λ or larger,
wherein $n_c$, Λ and d are adapted such that the fibre exhibits zero dispersion wavelength of a fundamental mode in the wavelength range from 1530 nm to 1640 nm;
whereby fibre designs with a relatively high nonlinear coefficient can be obtained.

PREFERRED EMBODIMENTS

In a preferred embodiment, the microstructured optical fibre comprises a glass background material in the cladding and/or in the core, such as a silica-based glass or a compound glass. Glass materials are preferred in order to a provide low-loss background material of the fibres, as well as a material that may be handled using presently known techniques for fabricating microstructured optical fibres.

In a further preferred embodiment, the cladding features are voids, such as holes filled with air, another gas, or a vacuum. Such features are preferred in order to utilize a high refractive index contrast to the fibre background material, as this provides flexibility for tailoring dispersion characteristics of the fibre as well as provide small effective mode field diameters.

In a further preferred embodiment, the microstructured optical fibre comprises a background material in the cladding with a refractive index in the range from 1.43 to 1.47, such as around 1.444. Such refractive index ranges are feasible using silica based materials, including pure, fused silica and silica doped with various materials, such as for example Ge, F, Al, P, Sn, B, La or combinations of these.

In a further preferred embodiment, $n_c$ is in the range of around 1.444 to 1.49, such as around 1.47. The core regions is preferred to have a higher refractive index than the background material of the cladding, and low-loss glass may be fabricated using silica technology with refractive indices of up to at least 1.49.

Compound glasses (such as for example chalcogonide glasses) may be preferred due to higher intrinsic nonlinearindex coefficient than silica-based glasses. Furthermore, for compound glasses the refractive index may be varied more freely than for silica glasses and therefore in preferred embodiments, the nonlinear microstructured optical fibre comprises compound glasses.

In a further preferred embodiment, the microstructured optical fibre comprises at least five rings or periods of cladding features surrounding the core, such as at least six rings or periods of cladding features surrounding the core, such as at least seven rings or periods of cladding features surrounding the core in order to reduce leakage losses and provide low loss transmission in the fibre.

In a further preferred embodiment, a majority of the cladding features being substantially equal in size. During fabrication it is often preferred to have voids of similar holes, and in order to provide ZDW around 1.5 mm, it is preferred that at least the three innermost rings of voids are substantially equal in size. Preferably, more rings surrounding the core have equally sized holes, such as at least four, five or more rings. A person skilled in the art will recognise that minor differences in size may results from the fabrication process. Typically such variations are less than a few percent.

In a further preferred embodiment, the microstructured optical fibre comprises cladding features with diameters of around 0.8 µm, such as in the range from 0.7 µm to 0.9 µm.

In a further preferred embodiment, the microstructured optical fibre comprises cladding features with centre-to-centre spacing, Λ, of around 1.6 µm, such as in the range from 1.2 µm to 1.8 µm.

In a further preferred embodiment, the core region has a core diameter, $d_c$, being defined as 2Λ-d, and this core diameter is in the range of 1.5 µm to 3.0 µm. In particular it is preferred that the core diameter is in the range of 2.2 µm to 2.5 µm.

In a further preferred embodiment, the core region comprises a core feature having a diameter, $d_{c,feat}$, being smaller than or equal to $d_c$. The core feature takes part in defining the refractive index profile of the core region, and the maximum refractive index of the core feature is identical to the maximum refractive index of the core region.

In a further preferred embodiment, the core feature has a diameter, $d_{c,feat}$, in the range of 0.2 $d_c$ to 0.9 $d_c$, such as in the range of 0.4 $d_c$ to 0.7 $d_c$, such as in the range of 0.45 $d_c$ to 0.55 $d_c$, such as around 0.50 $d_c$.

Other aspects and preferred embodiments appear elsewhere in the application.

It is to be understood that the following detailed description and accompanying drawings further describe principles and operation of exemplary embodiments of the invention, and that the invention is not intended to be limited thereto.

3. BRIEF DESCRIPTION OF THE DRAWINGS

In the following, by way of examples only, the invention is further disclosed with detailed description of preferred embodiments. Reference is made to the drawings in which FIG. 1 shows a schematic example of a preferred embodiment of fibre according to the present invention;

4. DETAILED DESCRIPTION

Figure 1:
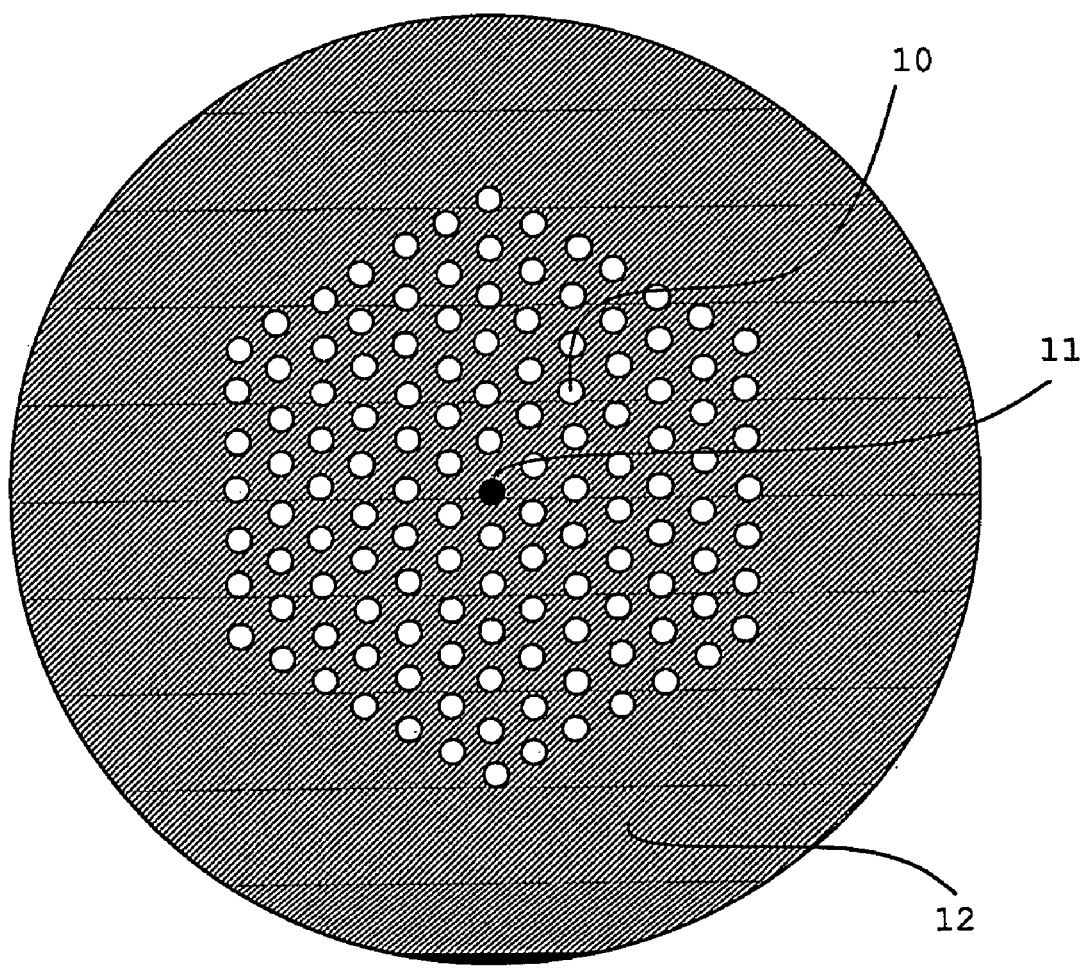

FIG. 1 shows a schematic example of an embodiment of a fibre according to the present invention comprising a microstructured cladding with close-packed features 10 having a diameter, d, and a centre-to-centre spacing, Λ. The fibre comprises further a core with a high index feature 11 having a higher refractive index than the background material of the cladding. The fibre further comprises a solid overcladding 12. The solid overcladding mainly serves to provide mechanical stability of the fibre and a given desired outer fibre diameter. Typically, another embodiment of a fibre according to the present invention includes further a coating—typically a polymer coating—for further mechanical stability of the fibre.

The fibre in FIG. 1 has d of around 0.8 µm and Λ of around 1.6 µm, and the number of periods or rings of cladding features surrounding the core is six, but higher numbers may be preferred in order to lower leakage or confinement losses. The fibre core comprises a feature of maximum refractive index, $n_c$, being around 2% higher than the refractive index of the cladding background material.

Figure 2:
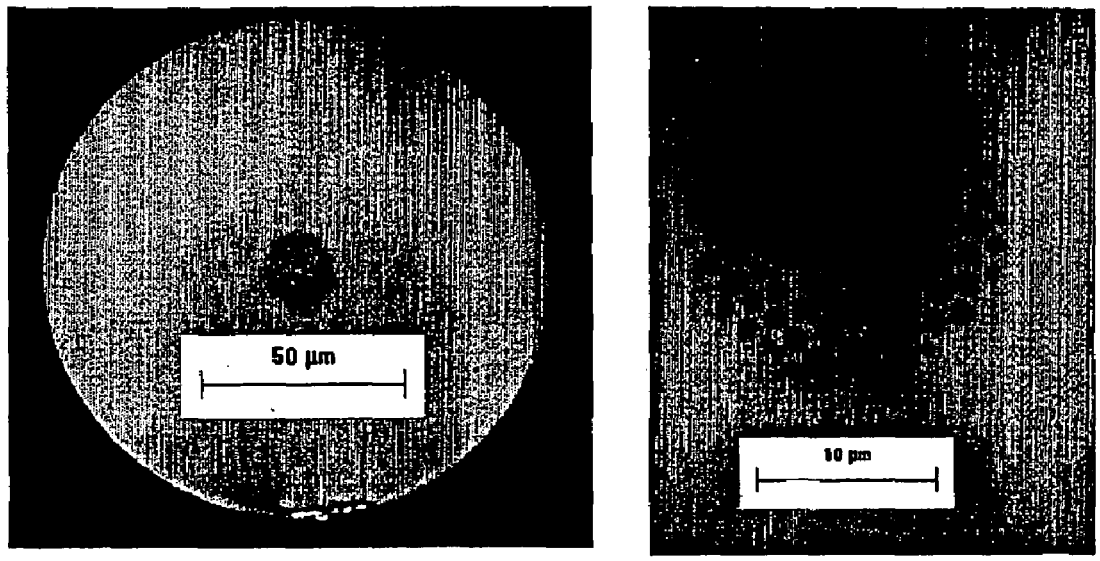
FIG. 2 shows microscope pictures of a preferred embodiment of a nonlinear microstructured optical fibre according to the present invention.

FIG. 2 shows microscope pictures of a fabricated fibre of an embodiment according to the present invention. The fibre has a solid silica core region with a diameter of around 2.3 µm (the core diameter defined for the given design as 2Λ-d). The core region comprises a high-index feature with a diameter of around 0.8 µm in diameter. The high-index feature, not visible in the pictures, has a parabolic index profile, but a broad range of other profiles are also covered by the present invention, and the maximum refractive index, $n_c$, of the core feature is around 2% higher than the refractive index of pure silica.

It turns out that the high-index feature in the core region provides increased nonlinear refractive index of the core, as well as it provides a smaller mode field diameter, and furthermore it aids to reduce confinement loss. The microstructured cladding consists of six periods of holes in a close-packed (also known as triangular) structure with an average hole-size of approximately 0.8 µm and an average or representative centre-to-centre spacing, Λ (or average pitch) of approximately 1.6 µm.

Embodiments of optical fibre according to the present invention may be obtained using methods known in the art, such as described by DiGiovanni et al. in U.S. Pat. No. 5,802,236, or Broderick et al. in WO 02/14946. Embodiments of the present fibre were produced in a step-wise process, where capillary tubes of approximately 2 mm in diameter were prepared and arranged in a periodic structure. A single, central capillary tube was replaced by a solid cane comprising a high-index region. The structure was placed in an overcladding tube to provide a preform and the preform was drawn to a cane with a diameter of around 3.6 mm using a conventional drawing tower operating at a temperature of around 1900° C. The cane was afterwards placed in a second overcladding tube and drawn into a second cane that again was overcladded and finally drawn to fibre using the same conventional drawing tower. The preform may be prepared by controlled heat treatment, optionally under pressure and/or vacuum of the capillary tubes and the interstitial voids between the tubes. A skilled person would know how to calibrate the parameters of the preparation, e.g. the temperature, pressure, vacuum, with respect to the glass of the capillaries applied, e.g. its thickness, viscosity, softness, etc., see e.g. the afore-mentioned references by DiGiovanni et al. or Broderick et al., the contents of which are incorporated herein by reference.

The fabricated fibre shown in FIG. 2 had a microstructured region being slightly elliptical (2.8%), resulting in an ellipticity of the core region. The ellipticity gives rise to a relatively strong birefringence that makes the fibre polarization maintaining. The birefringence has been measured using a fixed analyzer technique yielding a birefringence, Δn of approximately $1.1 \cdot 10^{-4}$ at 1550 nm. This degree of birefringence is equivalent to a mean differential group delay of 0.37 ps/m or a beat length of 14 mm.

Despite a small core size and an air-filled microstructured region, embodiments of fibres according to the present invention may be spliced to standard optical fibres using commonly available splicing equipment. Using a commercially available optical fibre with an ultra high NA, the fibre in FIG. 2 was spliced with a loss of around 0.3 dB.

In order to estimate the nonlinear coefficient of the fibre in FIG. 2, the near field has been measured at 1550 nm yielding an effective area of approximately 7 µm². Consequently, the fibre is estimated to have a nonlinear coefficient of at least 20 $(Wkm)^{-1}$, which is at least comparable to highly nonlinear fibres. Key data for the microstructured optical fibre is listed in table 1.

| | |
|---|---|
| Average pitch: | 1.6 μm |
| Average hole diameter: | 0.8 μm |
| Core diameter: | 2.3 μm |
| Fibre diameter: | 126 μm |
| Splice loss: | 0.3 dB |
| Numerical aperture: | ~0.5 |
| Birefringence: | $1.1 \cdot 10^{-4}$ |
| Nonlinear coefficient: | ~20 $(Wkm)^{-1}$ |

The uniformity of the fibre structure in FIG. 2 has been investigated by measuring pitch and core size along the three symmetry axis at four equally spaced positions in the fibre. The variation in pitch along the fibre is 2.4% and variation in core size is <1.5%. The data is shown in table 2.

| Position [m] | Average pitch [μm] | Average core size [μm] |
|---|---|---|
| 0 | 1.62 | 2.3 |
| 50 | 1.59 | 2.3 |
| 100 | 1.62 | 2.3 |
| 150 | 1.63 | 2.4 |

Figure 3:
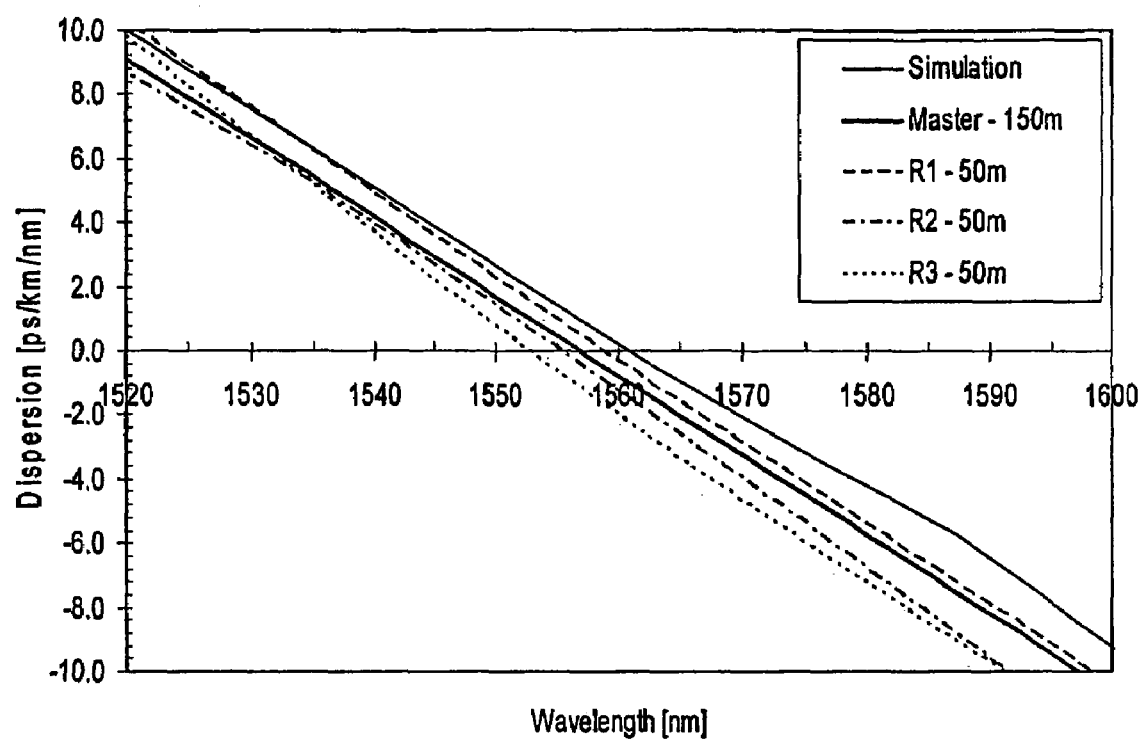
FIG. 3 shows dispersion properties of the fibre in FIG. 2 that has ZDW around 1.56 µm.

FIG. 3 shows four measurements of the dispersion of the fibre in FIG. 2: a measurement on a 150 m master spool and three measurements on the rewinds in which the master spool has been divided for uniformity test. The measurements show good uniformity along the fibre as the ZDW is positioned within a 6 nm band for the three parts of the fibre, equivalent to a 0.4% variation. It is noted that the 2.4% structural non-uniformity only results in a 0.4% variation in ZDW indicating inherent robustness in the design. The dispersion slope is in the range −0.25 to −0.27 ps/km/nm² at the ZDW. The negative slope of the fibre is especially interesting in combination with standard nonlinear fibres with positive dispersion slope, which enables creation of nonlinear devices with near-zero slope and low dispersion in a large wavelength range.

Figure 4:
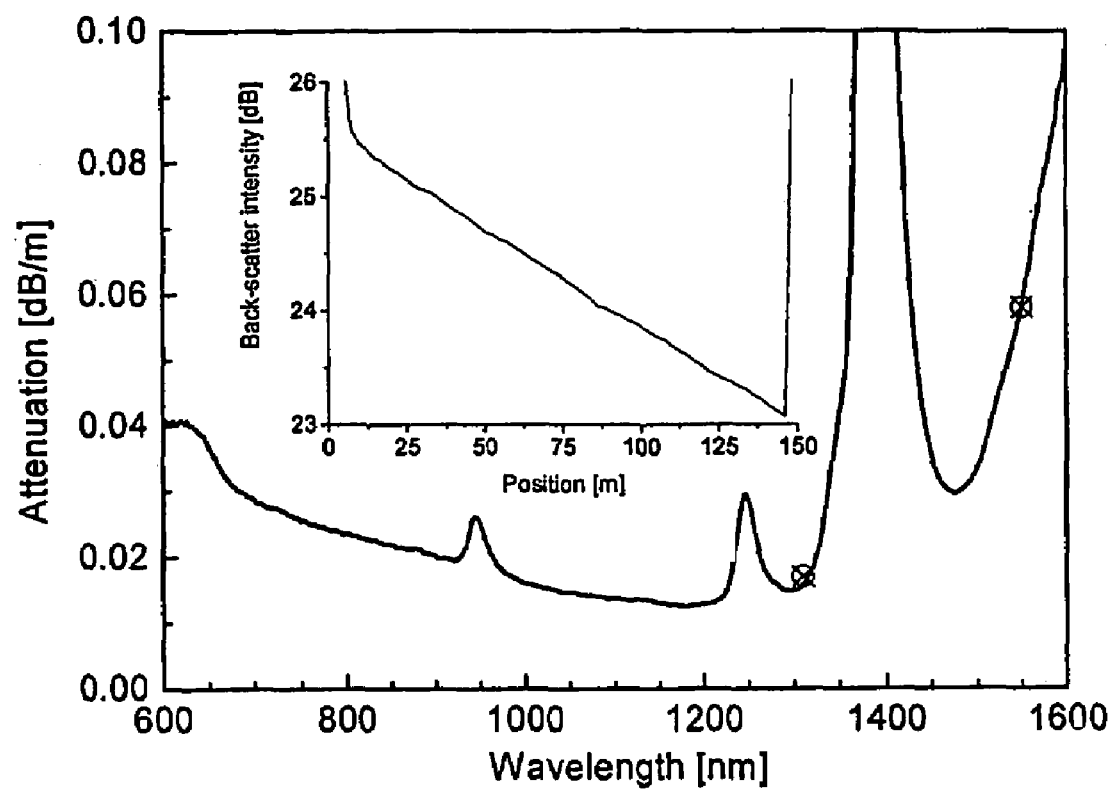
FIG. 4 shows the spectral attenuation of the fibre in FIG. 2 when spooled to a radius of 9 cm (solid line indicates white light measurements and the two points OTDR loss measurements. Inset shows OTDR trace at 1310 nm)

FIG. 4 shows measurements of the spectral attenuation in the fibre of FIG. 2. The figure shows a low loss below 0.03 dB/m in the range from 700 nm to 1300 nm and a steep loss edge starting around 1500 nm. The position and slope of this loss edge is unaffected by spool radius and the present inventors have realized that the increase in loss around 1500 nm arises from increasing confinement losses. Loss measurements performed with OTDR at 1310 nm and 1550 nm yield losses of 0.017 dB/m and 0.058 dB/m respectively, which is consistent with the white-light measurements. To improve the fibre of FIG. 2, more than five, such as more than six, such as more than seven periods of voids surrounding the core may be preferred. Apart from the confinement loss edge, the loss in the fibre is dominated by impurities and Si—OH absorption. Such losses may be lowered by improved quality of the material for the preform, by improved cleanness during preform assembling and handling, as well as during fibre drawing.

Figure 5:
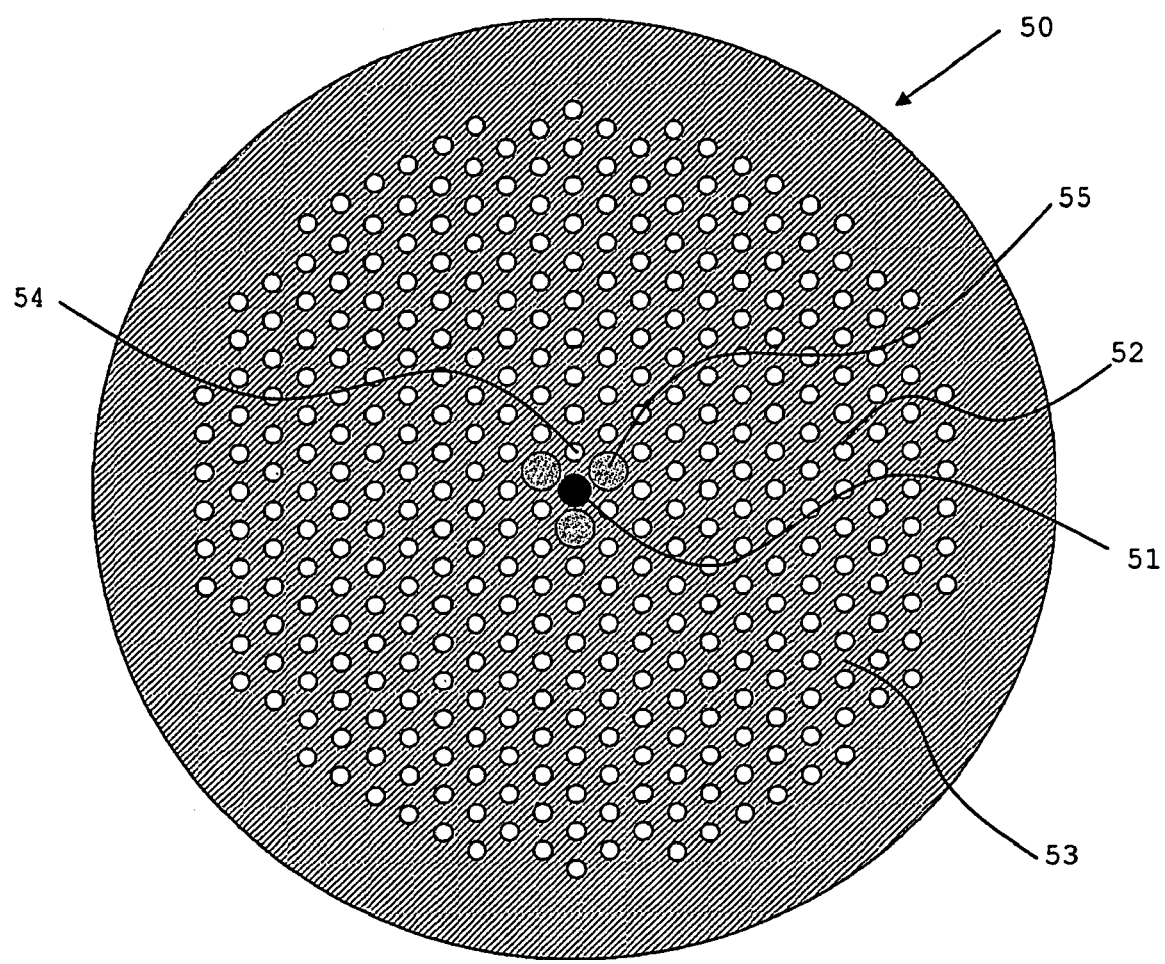
FIG. 5 shows a schematic example of another preferred embodiment of a fibre according to the present invention.

Another embodiment of a fibre according to the present invention is shown in FIG. 5. The fibre has an improved design to allow for a reduce dispersion slope characteristics, i.e. the fibre may exhibit a zero or near zero dispersion over a broad range of wavelengths. The reduced slope is obtained by raising the index around the core to a level higher than that for a fully periodic triangular structure with solid core. In contrast to the designs disclosed by Barkou et al. in WO 02/12931, the reduced slope is obtained by comprising— within a cross-section of the fibre—features or elements of a refractive index being lower than the core and preferably lower than the cladding background material, but higher than the material of the cladding holes. Alternatively, the design may be seen as being realized by a number of air holes around the core being replaced with down-doped glass features or elements, areas. Hence, FIG. 5 shows schematically a cross-section of an embodiment of a fibre 50 according to the present invention comprising a core 51 and a micro-structured cladding. The core comprises a material with refractive index $n_c$, and the cladding comprises a number of low-index cladding features 52 with refractive index $n_1$ that are placed in a cladding background material 53 with refractive index $n_b$. Immediately surrounding the core 51 are placed one or more first inner cladding features 54 and one or more second inner cladding features 55. The first inner cladding features have a refractive index similar to the low-index cladding features, namely $n_1$. The second inner cladding secondary features have a refractive index $n_2$. The fibre is characterized in that $n_2$ is lower than $n_c$ and $n_2$ is higher than $n_1$.

Alternatively, the fibre in FIG. 5 may be seen as an improvement to the fibre in FIG. 1, where a number of innermost holes around the core have been replaced by low-index glass features. In the example shown in FIG. 5, three air holes have been replaced by low-index glass features around the core.

In a preferred embodiment, the low-index cladding features 52 and the first inner cladding features have a substantially similar size.

In another preferred embodiment $n_2$ is lower than $n_b$.

In a further preferred embodiment, the first inner cladding features are made of silica or doped silica, such as F-doped silica.

Figure 6:
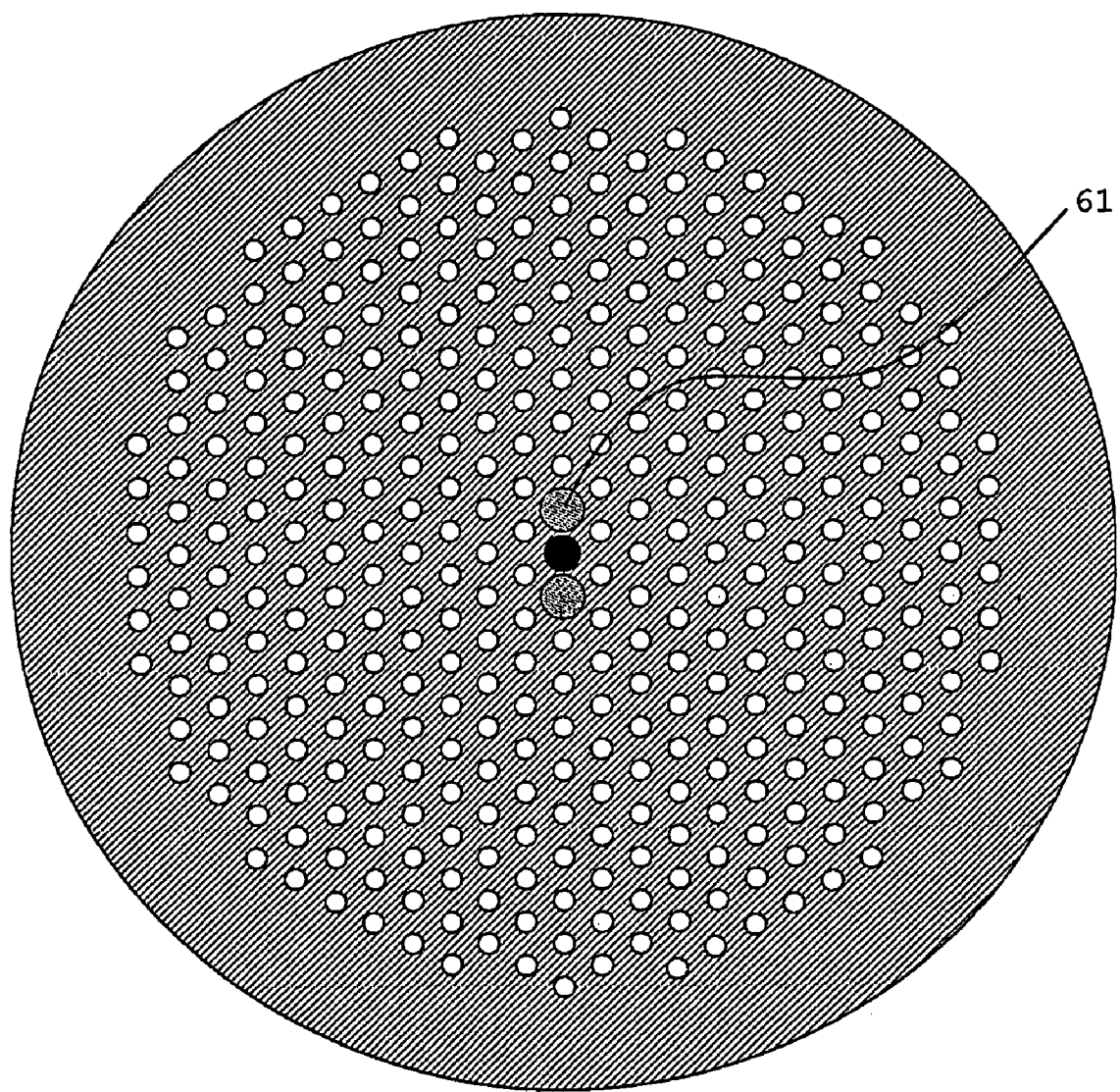
FIG. 6 shows a schematic example of a preferred embodiment of a polarization maintaining fibre according to the present invention.

The here-disclosed design ideas may also be used to provide polarization maintaining nonlinear optical fibre. FIG. 6 shows schematically an example of an embodiment of a fibre according to the present invention, where the number of second inner cladding features 61 is two. The fibre has a substantially two-fold symmetry in the fibre cross-section in order to enhance birefringence.

Figure 7:
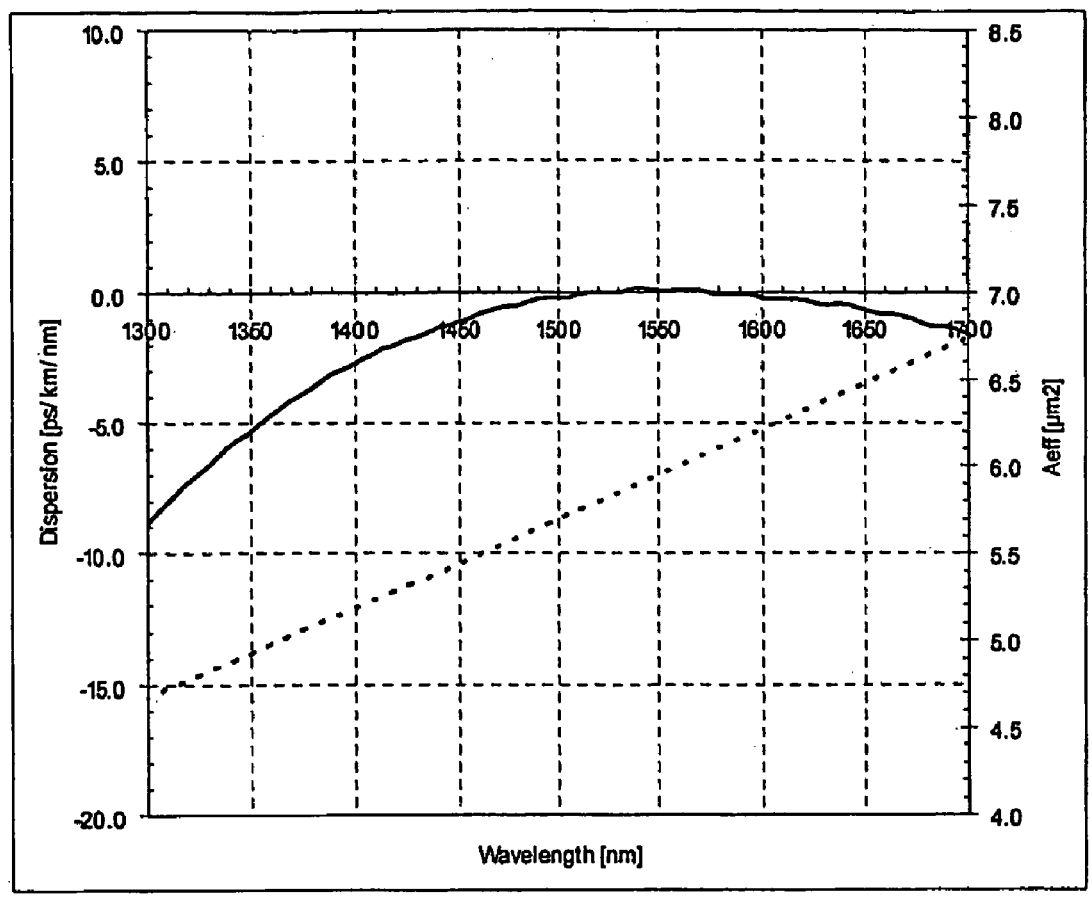
FIG. 7 shows dispersion and effective area properties of a fibre according to the present invention with flat, near-zero dispersion over about 100 nm around a wavelength of 1.55 µm.

FIG. 7 shows the results of calculating dispersion and effective area for a specific fibre with a design as shown schematically in FIG. 5. The fibre has a core 51 that is formed from a Ge-doped silica rod having $n_c$ of around 1.487, and a diameter of the doped part being equal to Λ, where Λ is the centre-to-centre distance between two low-index cladding features. The cladding background material is pure silica with $n_b$ of around 1.444, and the second inner cladding features have $n_2$ of around 1.439. The first inner cladding features and the low-index cladding features are similar and comprise air or vacuum, and they have a diameter of around 0.5Λ. Λ for the fibre is around 1.37 μm. FIG. 7 shows that there is a dramatic reduction of the dispersion slope for this fibre—as compared to the fibre of FIG. 3, while a small mode field area is maintained. Also the fibre in FIG. 7 has low confinement loss due to the relatively large size (d/Λ around 0.5) of the low-index cladding features.

From a fabrication point of view, it is an advantage that the first inner cladding features and the low-index cladding features have a substantially similar size. This allows for example use of similar preform elements to be used for the realization of the inner and outer parts of the microstructured cladding. Also it is an advantage that holes of substantially similar size are used, since it may be more difficult to control hole sizes accurately during fibre fabrication if holes of different sizes are present. For example using pressure control during drawing of the fibre, it is an advantage that a similar pressure may be applied to all holes for embodiments of fibres according to the present invention.

Figure 8:
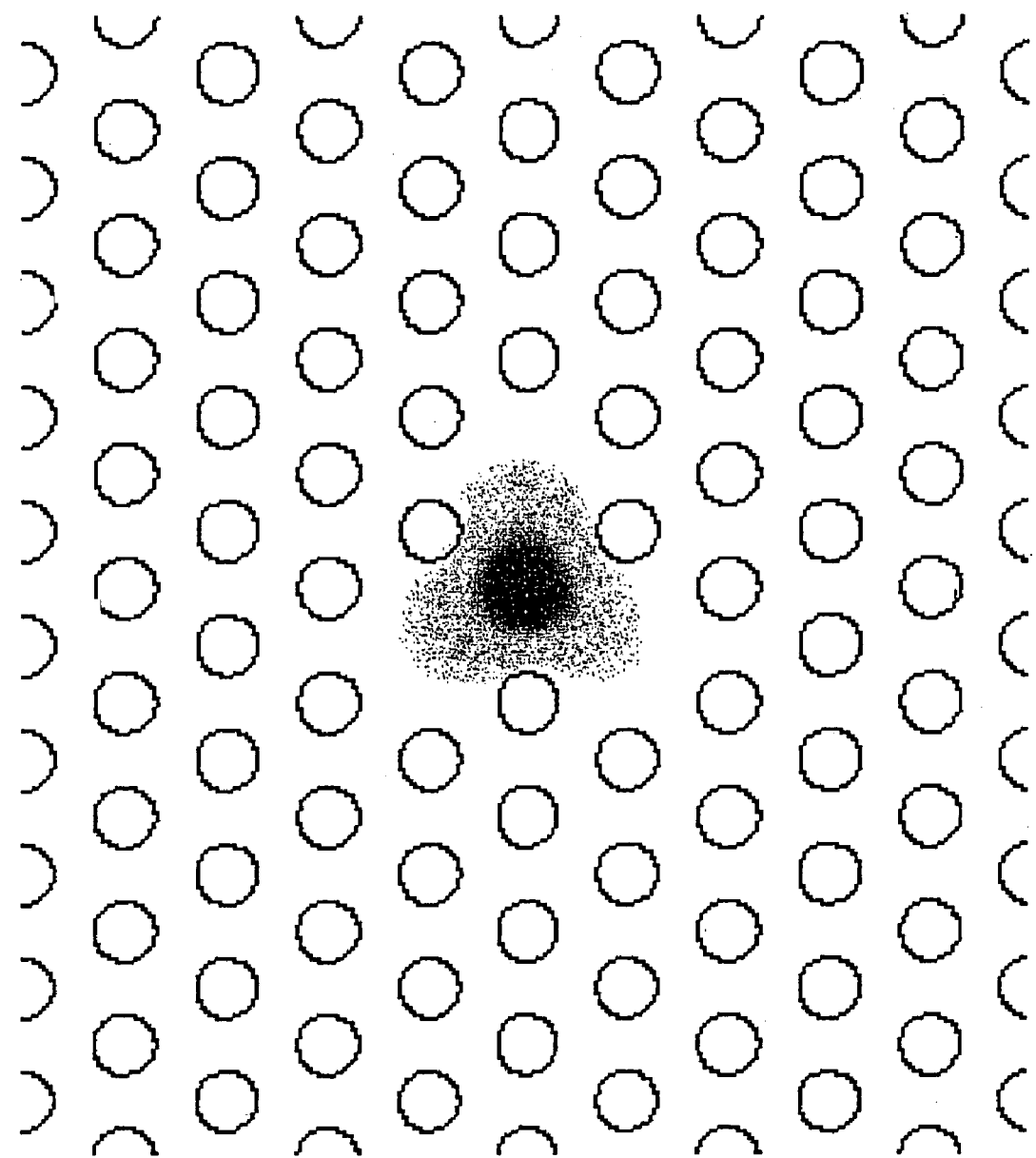
FIG. 8 shows the mode field distribution of the fibre of FIG. 7.

FIG. 8 shows the field distribution of the fundamental mode of the fibre in FIG. 7 at a wavelength of 1.55 μm. The mode is confined to the core of the fibre and only has a limited amount of its energy distributed outside the core.

Figure 9:
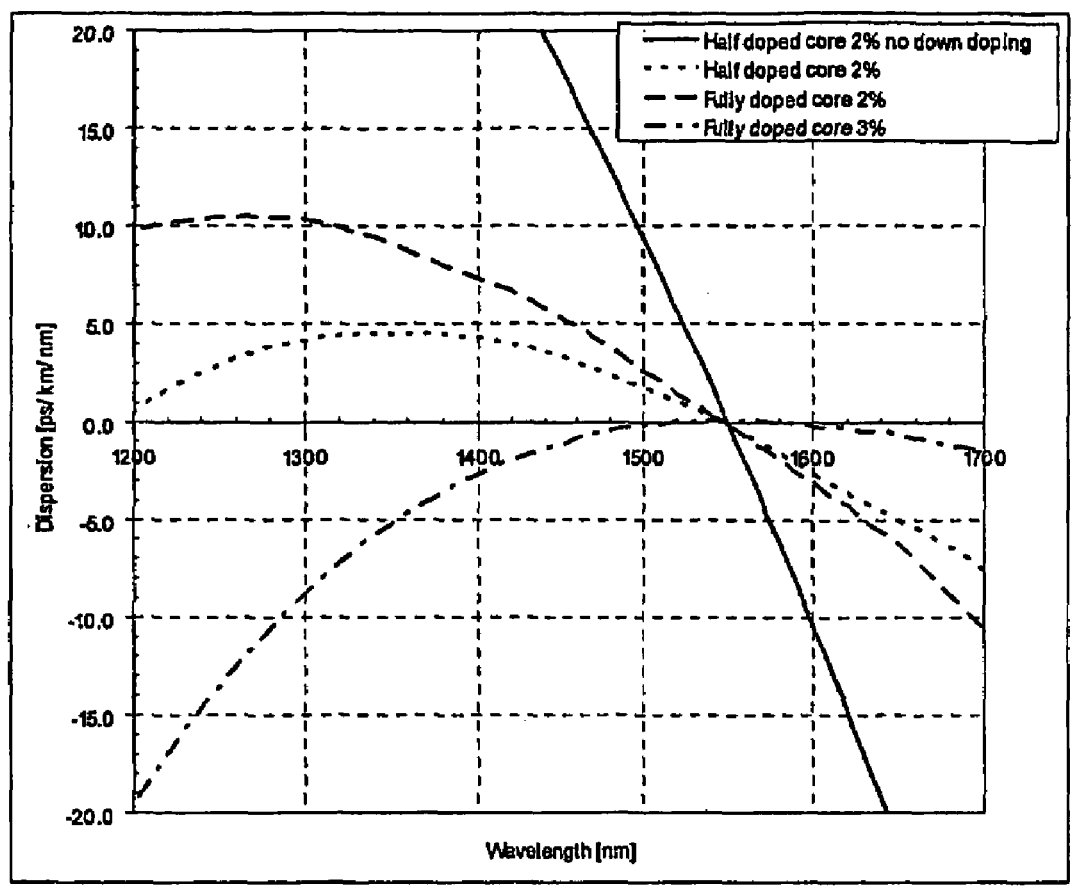
FIG. 9 shows dispersion properties of a series of embodiments of fibres according to the present invention with variation of various design parameters.

FIG. 9 shows the influence of core size and core doping level on the dispersion properties of a fibre with a design as shown schematically in FIG. 5. The solid curve shows the dispersion for a fibre where a part of the core has been up-doped to provide a 2% refractive index increase compared to pure silica. The diameter of the doped part of the core is 0.5Λ. The fibre has further $n_2$ equal to $n_b$ (no down-doping of the second inner cladding features; $n_2$ and $n_b$ being equal to the refractive index of pure silica that is around 1.444 at a wavelength of around 1.55 μm). The long-dashed curve shows the dispersion for a similar fibre as the fibre above, but with n2 equal to 1.439, and the second inner cladding features having a diameter of Λ. The short-dashed curve shows dispersion for a fibre similar to the fibre of the long-dashed curve, but with a core being fully doped over its diameter, Λ. Finally, the dashed-dotted curve shows the dispersion of the same fibre as in FIG. 7. This fibre is similar to the fibre of the short-dashed curve, but with a doped core having a refractive index being 3% higher than pure silica. As seen from FIG. 9, the use of second inner cladding features provides a reduced dispersion slope. As further seen from FIG. 9, the dispersion characteristics may be tuned by tuning the refractive index profile of the core. Further means for tuning the dispersion characteristics include adjusting the number, size, separation, and position of the low-index cladding features, of the first inner cladding doping level, as well as of the second inner cladding features.

Figure 10:
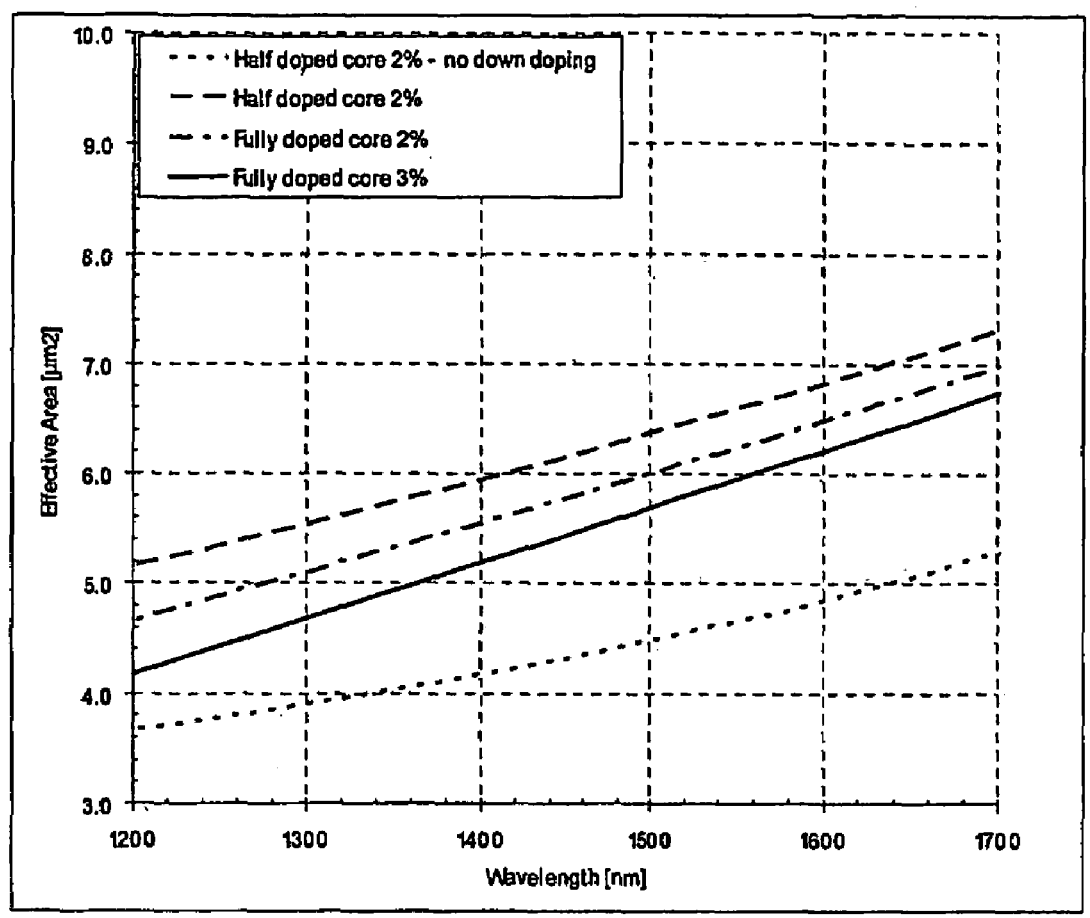
FIG. 10 shows effective area properties of a series of embodiments of fibres according to the present invention with variation of various design parameters.

FIG. 10 shows the influence of core size and core doping level on the effective area of the same series of fibres as in FIG. 9. The characteristics of the fibres for the four different curves are described for FIG. 9. FIG. 10 shows that fibres according to the present invention provide relatively low effective areas—corresponding to relatively high nonlinear coefficients. Hence, in combination, FIGS. 9 and 10 demonstrate that embodiments according to the present invention provides improved nonlinear optical fibres where it is possible to obtain a relatively high nonlinear coefficient and a high control over the dispersion and dispersion slope characteristics. In particular, the present invention provides an improved nonlinear fibre, having a small effective area (a high nonlinear coefficient) and a zero or near-zero dispersion wavelength around 1550 nm, as well as a flat dispersion (a reduced dispersion slope).

Figure 11:
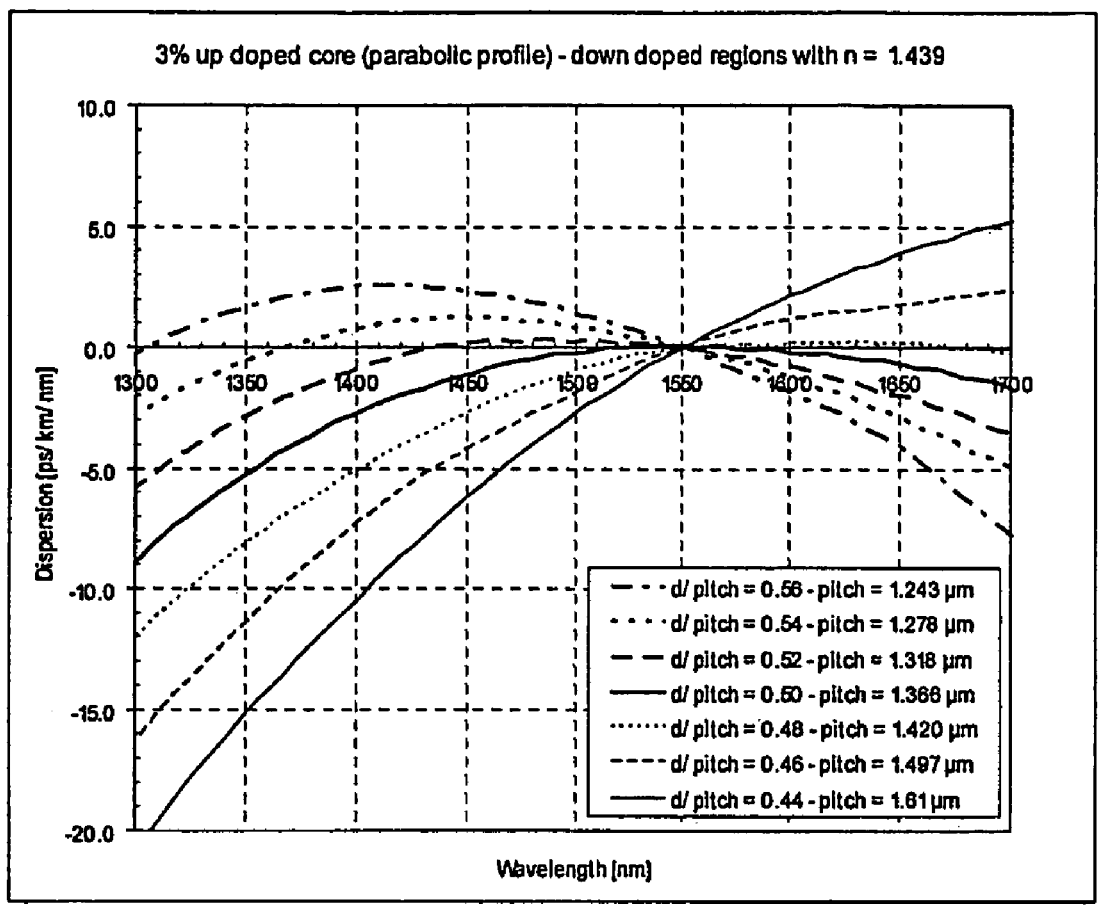
FIG. 11 shows dispersion properties of another series of embodiments of fibres according to the present invention with variation of various design parameters.

Fibres according to the present invention have many degrees of freedom for tailoring their properties for a given application. As an example of the flexibility in tailoring the dispersion slope of a fibre with ZDW around 1550 nm, FIG. 11 shows the dispersion properties for a series of embodiments of fibres with a design a shown schematically in FIG. 5 and characteristics as for the fibre in FIG. 7, but d/Λ for the low-index cladding features varying from 0.44 to 0.56 and Λ varying from 1.24 μm to 1.61 μm. As seen from the figure, the dispersion slope may be tailored from both negative, zero and positive values around 1550 nm by adjusting the above-mentioned parameters.

Figure 12:
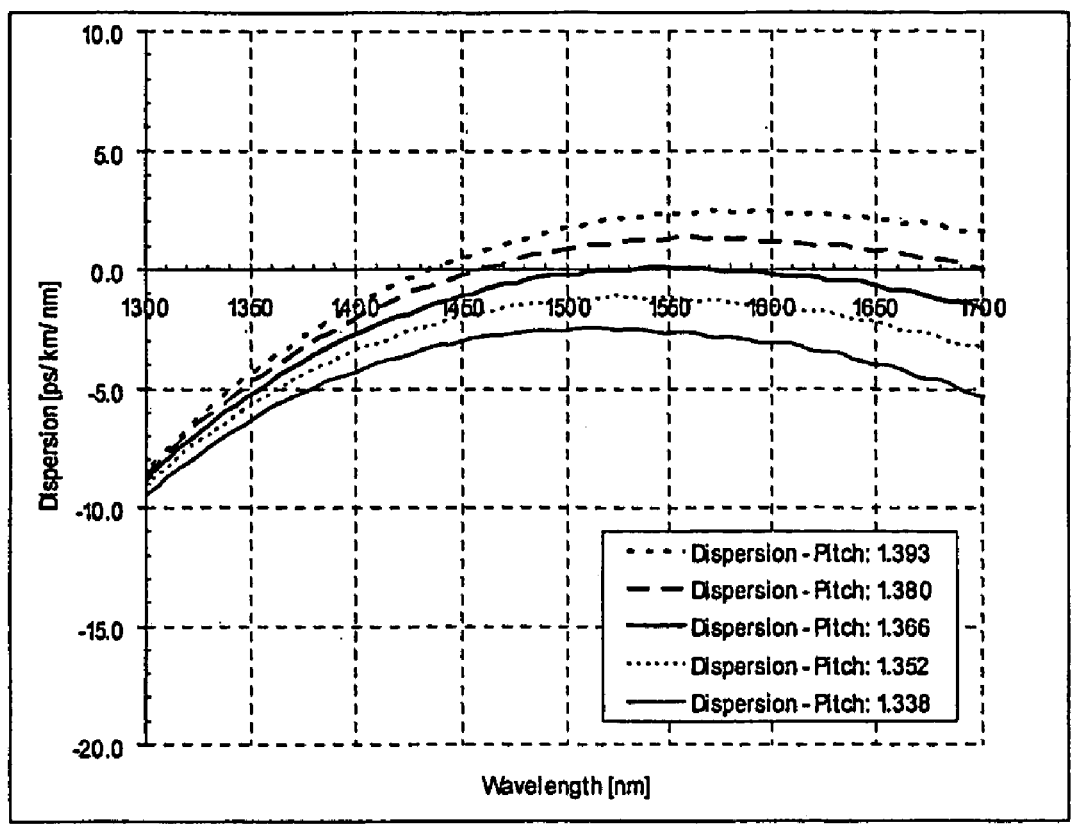
FIG. 12 shows dispersion properties of a series of embodiments of fibres according to the present invention with variation of a single design parameter.
Figure 13:
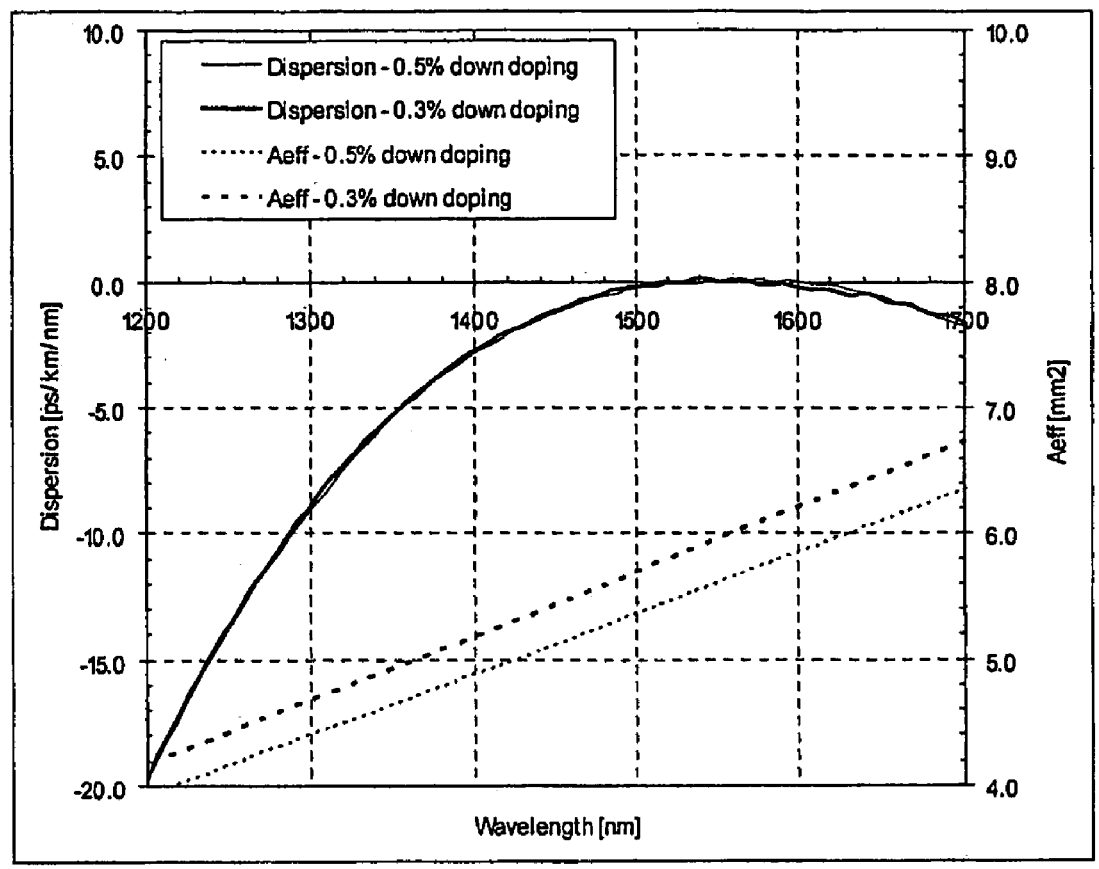
FIG. 13 shows dispersion and effective area properties of two different embodiments of fibres according to the present invention with flat, near-zero dispersion over about 100 nm around a wavelength of 1.55 µm.

To further demonstrate the flexibility for fibres according to the present invention, FIG. 12 shows the dispersion properties of the embodiment of a fibre shown in FIG. 7, where Λ is varied from around 1.34 μm to around 1.40 μm. FIG. 13 shows the effect on the dispersion and effective area of adjusting the refractive index of the second inner cladding features for the fibre of FIG. 7. In FIG. 13, $n_2$ is varied from 0.3% to 0.5% lower than pure silica. As seen from FIG. 13, the dispersion properties are affected to a small degree, whereas the effective area is lowered for the decreased value of $n_2$.

Figure 14:
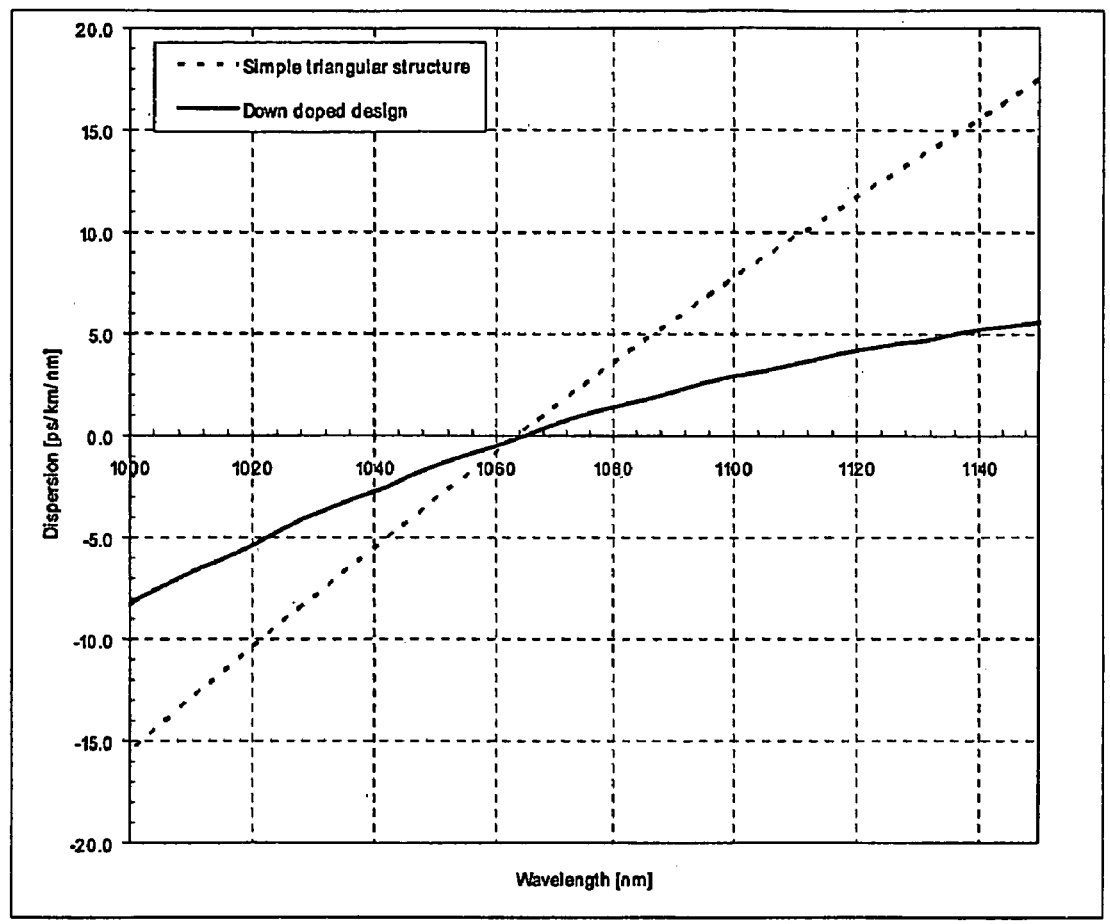
FIG. 14 shows dispersion properties of two different embodiments of fibres with ZDW around 1064 nm.

Optical fibres according to the present invention are also of interest for applications at other wavelengths than around 1.3 μm to 1.7 μm, such as for applications at visible wavelengths and short near-infrared wavelengths—such as wavelengths from 400 nm to 1.3 μm, in particular for application at wavelengths around 800 nm and around 1064 nm. As an example, FIG. 14 demonstrates how the dispersion slope may be decreased for a nonlinear fibre with ZDW around 1.06 μm using a design as schematically shown in FIG. 5 (solid curve) as compared to a fibre with a design as schematically shown in FIG. 1 (dashed curve). The dashed curve is for a fibre comprising a doped core with $n_c$=1.472, and cladding holes having d=0.53Λ and Λ=2.05 μm, whereas the solid curve shows the dispersion for a fibre comprising a doped core with $n_c$=1.472, second inner cladding features with $n_2$=1.440, and low-index cladding features having diameter 0.5Λ and Λ=1.2 μm, and first inner cladding features of similar size as the low-index cladding features. Both fibres have pure silica cladding background material. As seen from FIG. 14, the use of second inner cladding features provides means for reducing the dispersion slope. As previously discussed, such a property may be desired for a number of reasons, including, but not limited to, reduction of threshold power of non-linear effect and broader bandwidth of a nonlinear device.

Figure 15:
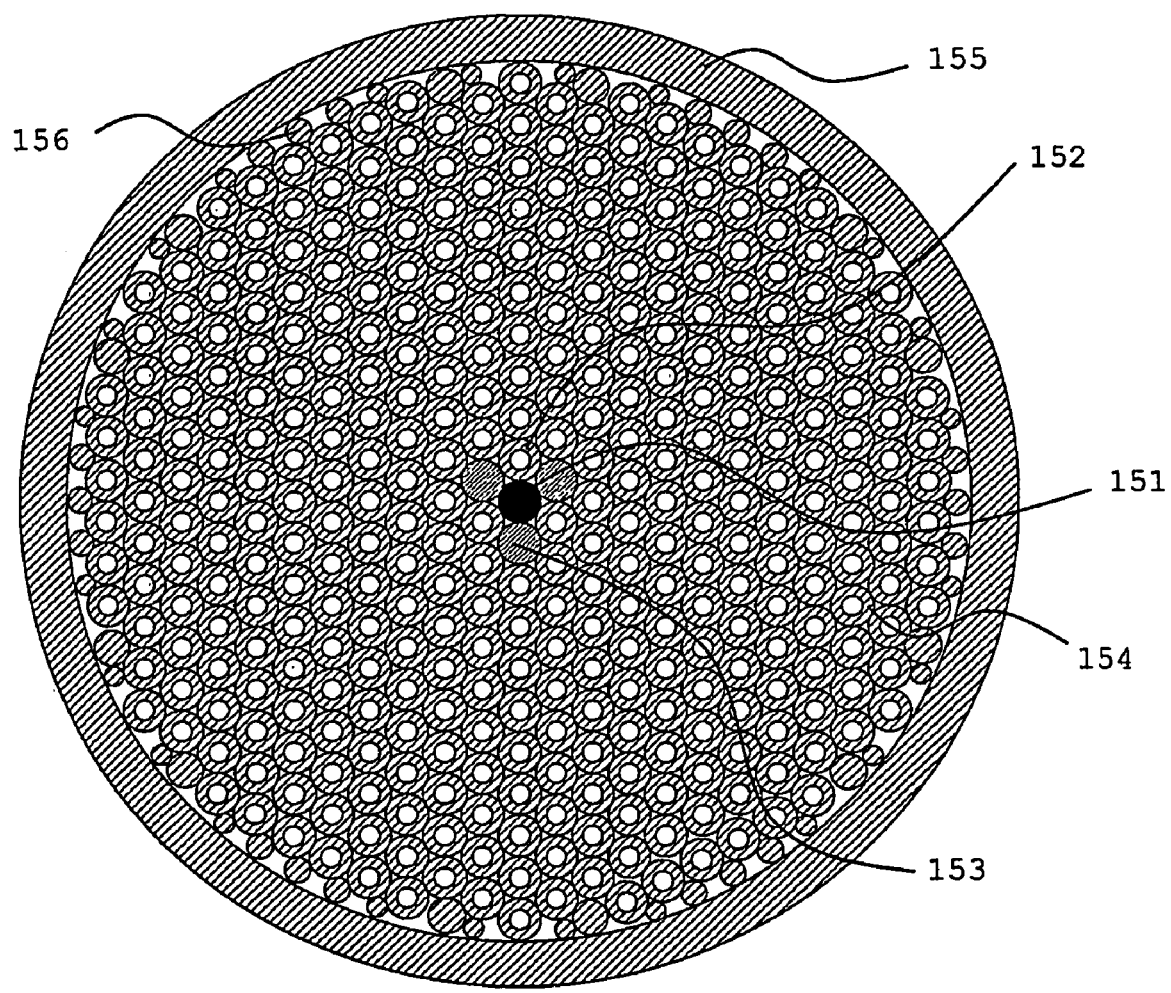
FIG. 15 shows a schematic example of a preform for producing a fibre according to the present invention.

FIG. 15 shows an exemplary preform for fabricating a fibre according to the present invention. In the center, the preform comprises a rod 151. This rod may preferably be a silica rod doped with for example Ge having a diameter of a few millimeters (for example 3 mm). Such doped rods may be purchased from various commercial suppliers, e.g. Fiber-Core. Outside the core rod is placed a first ring of preform elements. These preform elements include capillary tubes 152 and solid low-index rods 153, that will provide the first and second inner cladding features in the final fibre. The capillary tube may be purchased from various commercial suppliers, e.g. Hereaus, and the low-index rods are preferably F-doped silica that may also be purchased from various commercial suppliers, e.g. Hereaus or ShinEtsu. Outside the first ring of preform elements is placed a number of capillary tubes 154 that provides the outer part of the microstructured cladding. These capillary tubes are preferably identical to capillary tubes in the inner cladding. The preform elements are placed in an overcladding tube 155 (available also from e.g. Hereaus) that provides mechanical support and holds together the preform. The preform may further comprise various stuffing elements 156 to support the capillary tubes and aid in maintaining them in a desired position. The various elements of the preform may be stacked in various arrangements to yield a desired structure—as would be known to a person skilled in the art. Also other manners of realizing the preform, for example using drilling of holes in glass rods, extrusion or sol-gel techniques may be preferred—as described in the prior art, see for example WO 00/06506 or EP 1 172 339. Further information on fabricating microstructured fibres may be found in U.S. Pat. No. 5,802,236 or WO 00/49436. The preform and the preform elements may optionally be fixed by inserting the preform into a lathe where the preform is heated to melt together all or part of the preform elements. Preferably, a pressure may be applied to the capillary tubes to maintain them open. Also, a less than atmospheric pressure may be applied between the preform elements in order to seal them together and collapse interstitial voids in the preform.

Figure 16:
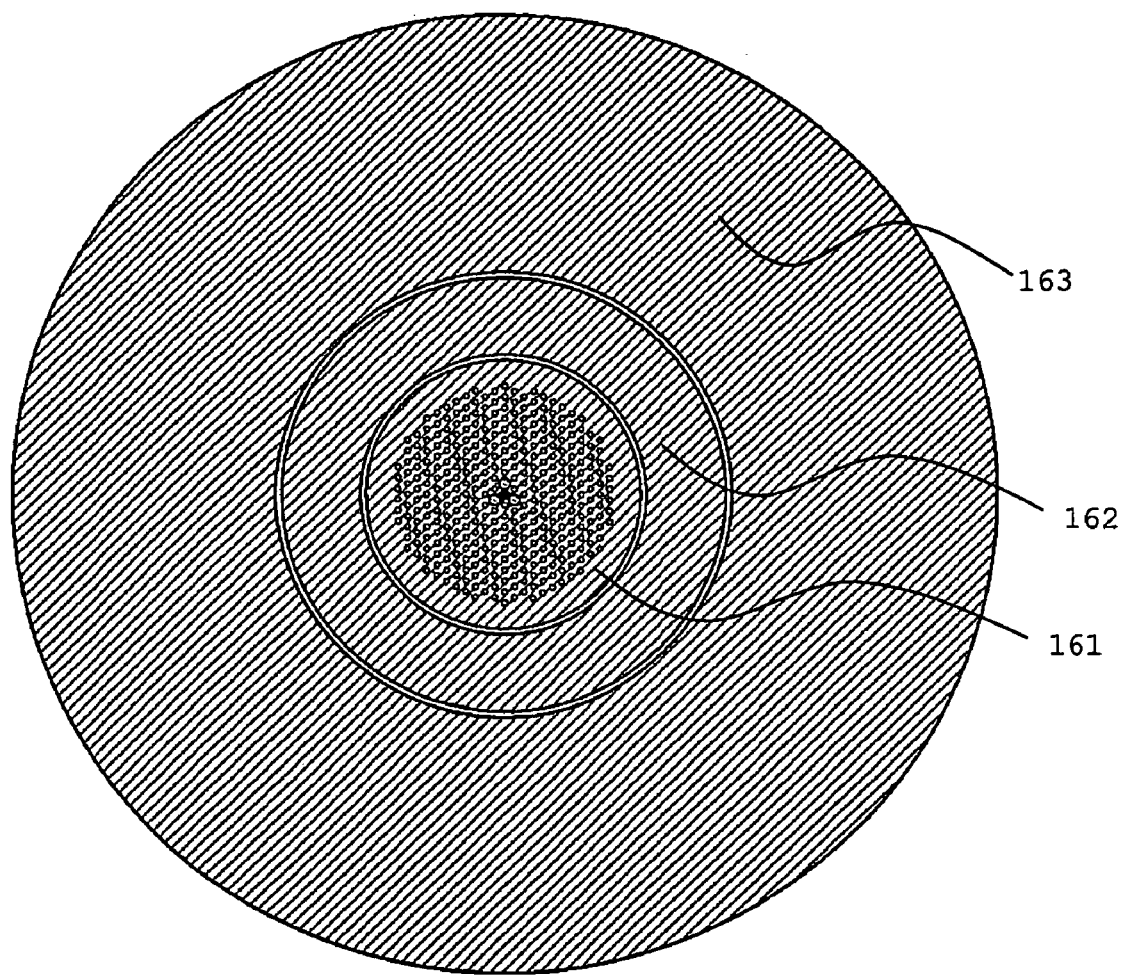
FIG. 16 shows a schematic example of a preform cane for producing a fibre according to the present invention.

The preform in FIG. 15 may be drawn into a cane with a diameter of a few millimeters, for example 4 mm, using a conventional drawing tower that is operated at a temperature of around 1900 degrees Celsius. Preferably the pressure in the capillary tube is controlled during drawing of the cane. Alternatively, the capillary tubes may be closed at their top end to ensure that holes do not collapse. Alternatively, the capillary tubes are kept open and a less than atmospheric pressure is applied between the capillary tubes (inside the overcladding tube) to collapse to interstitial voids between the various preform elements. The size of the holes and the closure of interstitial voids may be controlled by adjusting the pulling and/or preform feeding speed, and temperature during drawing—as would be known to a person skilled in the art of producing microstructured fibres. After fabrication of the preform cane, the cane may be further overcladded as shown in FIG. 16, where the preform cane 161 has been overcladding by two overcladding tubes 162 and 163. This new preform may be drawn into fibre using a similar conventional drawing tower. Preferably the pressure in the hole in the preform cane is controlled and/or adjusted during fibre drawing. Preferably, a less than atmospheric pressure is applied between the preform cane and the overcladding tube as well as between the two overcladding tubes in order to seal together the preform cane and the two overcladding tubes. Naturally, a single overcladding tube or more overclading tubes may be used. Alternatively, the sealing of the preform cane and the overcladding tube(s) may be performed at a lathe prior to fibre drawing. The fibre is preferably drawn to an outer diameter of 125 µm and one or more layers of coating as known from standard optical fibre technology is applied.

The invention claimed is:

1. An optical fibre for transmitting light of at least one predetermined wavelength $\lambda$, the optical fibre having a longitudinal direction and a cross-section perpendicular thereto, the optical fibre comprising:
   (a) a core region comprising a core material of refractive index $n_c$; and
   (b) a cladding region, said cladding region surrounding said core region and comprising low-index cladding features of refractive index $n_1$ arranged in a background cladding material of refractive index $n_b$;
   said cladding region further comprising first inner cladding features of refractive index $n_1$ and second inner cladding features of refractive index $n_2$, where $n_2$ is lower than $n_c$, and $n_2$ is higher than $n_1$, and
   said first inner cladding features and said second inner cladding features are arranged proximal to said core region, and
   $n_2$ is lower than $n_b$.

2. The optical fibre according to claim 1, wherein a number or all of said low-index cladding features have a diameter $d_{1,outer}$ and a centre-to-centre spacing $\Lambda_{1,outer}$, and $d_{1,outer}$ is around $0.4\Lambda_{1,outer}$ or larger.

3. The optical fibre according to claim 1, wherein a number or all of said first inner cladding features have a diameter $d_{1,inner}$ and a centre-to-centre spacing $\Lambda_{1,inner}$ and $d_{1,inner}$ is around $0.4\Lambda_{1,inner}$ or larger.

4. The optical fibre according to claim 2, wherein a number or all of said first inner cladding features have a diameter $d_{1,inner}$, and $d_{1,inner}$ is around $0.4\Lambda_{1,outer}$ or larger.

5. The optical fibre according to the claim 2, wherein $d_{1,outer}$ is in the range of $0.4\Lambda_{1,outer}$ to $0.60\Lambda_{1,outer}$.

6. The optical fibre according to claim 4, wherein $d_{1,inner}$ is in the range of $0.4\Lambda_{1,outer}$ to $0.60\Lambda_{1,outer}$.

7. The optical fibre according to claim 2, wherein a plurality or all of said first inner cladding features have a diameter $d_{1,inner}$ and wherein $d_{1,outer}$, and $d_{1,inner}$ are substantially similar.

8. The optical fibre according to claim 2, wherein a plurality or all of said first inner cladding features have a centre-to-centre spacing $\Lambda_{1,inner}$ and wherein $\Lambda_{1,outer}$ and/or $\Lambda_{1,inner}$ is in the range of 1.0 µm to 2.0 µm.

9. The optical fibre according to claim 2, wherein a plurality or all of said first inner cladding features have a diameter $d_{1,inner}$ and wherein $d_{1,outer}$ and/or $d_{1,inner}$ is in the range of 0.4 µm to 1.2 µm.

10. The optical fibre according to claim 1, wherein said core region comprises silica and/or silica doped with a material to provide an increase of refractive index compared to pure silica.

11. The optical fibre according to claim 2, wherein $n_c$ is about or more than 1% higher than the refractive index of pure silica.

12. The optical fibre according to claim 1, wherein $n_c$ is larger than 1.444.

13. The optical fibre according to claim 1, wherein said first inner cladding features comprise silica or silica doped with a material to provide a decrease of refractive index compared to pure silica.

14. The optical fibre according to claim 2, wherein $n_2$ is about or more than 0.1% lower than the refractive index of pure silica.

15. The optical fibre according to claim 1, wherein $n_2$ is lower than 1.444.

16. The optical fibre according to claim 1, wherein said low-index cladding features and said first inner cladding features are voids.

17. The optical fibre according to claim 1, wherein said optical fibre comprises at least five rings or periods of low-index cladding features surrounding the core.

18. The optical fibre according to claim 1, wherein a majority of said low-index cladding features are substantially equal in size.

19. The optical fibre according to claim 1, wherein said low-index cladding features within a distance of at least three periods from the core are sub-stantially equal in size.

20. The optical fibre according to claim 1, wherein said core region comprises a core feature having a diameter, $d_{c,feat}$, said core feature having a refractive index profile with a maximum refractive index being equal to $n_c$.

21. The optical fibre according to claim 2, wherein said core region comprises a core feature having a diameter, $d_{c,feat}$, and wherein $d_{c,feat}$ is in the range of $0.2\Lambda_{1,outer}$ to $1.0\Lambda_{1,outer}$.

22. The optical fibre according to claim 1, wherein said optical fibre comprises a limited number of second inner cladding features, said limited number being equal to two or three.

23. The optical fibre according to claim 1, wherein said predetermined wavelength $\lambda$ is in the range of 1.3 µm to 1.7 µm.

24. The optical fibre according to claim 1, wherein said predetermined wavelength $\lambda$ is in the range of 0.6 µm to 1.0 µm.

25. The optical fibre according to claim 1, wherein said predetermined wavelength λ is in the range of 1.0 µm to 1.3 µm.

26. A method of producing a microstructured optical fibre, the method comprising:
(a) providing a preform by providing and arranging preform elements in a predetermined structure:
at least one high-index rod to form a core region of the preform,
and surrounding said high-index rod by first elements of capillary tubes and low-index rods to form an inner cladding region proximal to said at least one high-index rod, said capillary tubes and low-index rods providing first and second inner cladding features in a final fibre, and
surrounding said at least one high-index rod, said first elements of capillary tubes and said low-index rods by outer elements of capillary tubes providing an outer part of the micro-structured cladding; and
(b) consolidating said structure; and
(c) drawing said preform to an optical fibre with predetermined dimension under a controlled heat treatment.

27. A method of guiding electromagnetic waves comprising providing an optical fibre with a core region comprising a core material of refractive index $n_c$ and a cladding region, said cladding region surrounding said core region and comprising low-index cladding features of refractive index $n_1$ arranged in a background cladding material of refractive index $n_b$, said cladding region further comprising first inner cladding features of refractive index $n_1$ and second inner cladding features of refractive index $n_2$, where $n_2$ is lower than $n_c$, and $n_2$ is higher than $n_1$, and said first inner cladding features and said second inner cladding features being arranged proximal to said core region, and with $n_2$ being lower than $n_b$; and feeding said optical fibre with electromagnetic waves having wavelength from 400 nm to 1.7 µm.

28. An article comprising an optical fibre for transmitting light of at least one predetermined wavelength λ, the optical fibre having a longitudinal direction and a cross-section perpendicular thereto, the optical fibre comprising:
(a) a core region comprising a core material of refractive index $n_c$; and
(b) a cladding region surrounding said core region and comprising low-index cladding features of refractive index $n_1$ arranged in a background cladding material of refractive index $n_b$,
said cladding region further comprising first inner cladding features of refractive index $n_1$ and second inner cladding features of refractive index $n_2$, wherein $n_2$ is lower than $n_c$, and $n_2$ is higher than $n_1$,
said first inner cladding features and said second inner cladding features being arranged proximal to said core region, and
$n_2$ being lower than $n_b$.

29. The article according to claim 28, wherein said article is a coated optical fibre or a cabled optical fibre.

30. The article according to claim 28, wherein said article is a nonlinear device.

31. The article according to claim 28, wherein said article is an optical communication system, an optical fibre laser, an optical fibre amplifier, an optical fibre Raman amplifier, a dispersion compensator, a dispersion and/or dispersion slope compensator, a combined dispersion compensator and Raman amplifier, a combined dispersion slope compensator and Raman amplifier, a combined dispersion and dispersion slope compensator and Raman amplifier, or a super-continuum generator.

32. The method as defined in claim 26, further comprising using said optical fibre to guide electromagnetic waves by incorporating said optical fibre into an article selected from the group consisting of an optical communication system, an optical fibre laser, an optical fibre amplifier, an optical fibre Raman amplifier, a dispersion compensator, a dispersion and/or dispersion slope compensator, a combined dispersion compensator and Raman amplifier, a combined dispersion slope compensator and Raman amplifier, a combined dispersion and dispersion slope compensator and Raman amplifier, and a super-continuum generator; and feeding said optical fibre with electromagnetic waves having wavelength from 400 nm to 1.7 µm.

33. A method of producing a microstructured optical fibre, the method comprising:
providing a preform by providing and arranging preform elements in a predetermined structure:
at least one high-index rod to form a core region of the preform,
and surrounding said high-index rod by first elements of capillary tubes and low-index rods to form an inner cladding region proximal to said at least one high-index rod, said capillary tubes and low-index rods providing first and second inner cladding features in a final fibre, and
surrounding said at least one high-index rod, said first elements of capillary tubes and said low-index rods by outer elements of capillary tubes providing an outer part of the micro-structured cladding; and
drawing said preform to a preform cane with predetermined dimension under a controlled heat treatment, followed by drawing said preform cane to an optical fibre with predetermined dimension under a controlled heat treatment.

34. A method of producing a microstructured optical fibre, the method comprising:
providing a preform by providing and arranging preform elements in a predetermined structure:
at least one high-index rod to form a core region of the preform,
and surrounding said high-index rod by first elements of capillary tubes and low-index rods to form an inner cladding region proximal to said at least one high-index rod, said capillary tubes and low-index rods providing first and second inner cladding features in a final fibre, and
surrounding said at least one high-index rod, said first elements of capillary tubes and said low-index rods by outer elements of capillary tubes providing an outer part of the micro-structured cladding; and
drawing said preform to an optical fibre with predetermined dimension under a controlled heat treatment.

35. The optical fibre according to claim 1, wherein said optical fibre comprises at least seven rings or periods of low-index cladding features surrounding the core.

36. The optical fibre according to claim 1, wherein said low-index cladding features within a distance of at least five periods from the core are substantially equal in size.

* * * * *